(12) United States Patent
Yamamoto et al.

(10) Patent No.: US 12,021,358 B2
(45) Date of Patent: Jun. 25, 2024

(54) WIRING MEMBER

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Moriyuki Shimizu, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 169 days.

(21) Appl. No.: 17/756,464

(22) PCT Filed: Nov. 12, 2020

(86) PCT No.: PCT/JP2020/042244
§ 371 (c)(1),
(2) Date: May 25, 2022

(87) PCT Pub. No.: WO2021/106599
PCT Pub. Date: Jun. 3, 2021

(65) Prior Publication Data
US 2022/0416523 A1 Dec. 29, 2022

(30) Foreign Application Priority Data

Nov. 27, 2019 (JP) .................................. 2019-214103

(51) Int. Cl.
*H02G 3/04* (2006.01)
*B60R 16/02* (2006.01)
(Continued)

(52) U.S. Cl.
CPC ............ *H02G 3/04* (2013.01); *B60R 16/0215* (2013.01); *H01B 7/1825* (2013.01); *H02G 3/38* (2013.01)

(58) Field of Classification Search
CPC ........ H02G 3/04; H02G 3/38; B60R 16/0215; H01B 7/1825
(Continued)

(56) References Cited

U.S. PATENT DOCUMENTS 3,911,201 A * 10/1975 Fry ...................... H01B 7/0045
174/72 A
5,164,546 A * 11/1992 Kumagai ............... H02G 11/00
439/459
(Continued)

FOREIGN PATENT DOCUMENTS

JP 2001-128333 A 5/2001

OTHER PUBLICATIONS

International Search Report, Application No. PCT/JP2020/042244, mailed Dec. 22, 2020. ISA/Japan Patent Office.

*Primary Examiner* — Timothy J Thompson
*Assistant Examiner* — Michael F McAllister
(74) *Attorney, Agent, or Firm* — Honigman LLP

(57) ABSTRACT

An object is to further improve the reliability of a bent section of a linear transmission member. Provided is a wiring member including: a linear transmission member that includes a bent section; and a resin molded portion molded with a path holding portion of the linear transmission member being inserted thereinto, the path holding portion including the bent section, wherein recesses are formed so as to expose portions of the path holding portion other than a portion where tensile stress is concentrated due to bending, to the outside.

7 Claims, 3 Drawing Sheets

(51) Int. Cl.
*H01B 7/18* (2006.01)
*H02G 3/38* (2006.01)

(58) Field of Classification Search
USPC .................................................. 174/72 A
See application file for complete search history.

(56) References Cited

U.S. PATENT DOCUMENTS

| | | | |
|---|---|---|---|
| 5,957,702 A * | 9/1999 | Nagai | B60R 16/0215 |
| | | | 439/501 |
| 6,257,897 B1 | 7/2001 | Kubota | |
| 8,927,868 B2 * | 1/2015 | Biggadike | E05D 11/0081 |
| | | | 244/99.2 |
| 2009/0122976 A1 * | 5/2009 | Edelmann | H01R 9/2416 |
| | | | 379/413.04 |
| 2012/0125683 A1 * | 5/2012 | Mabuchi | B60R 16/0215 |
| | | | 174/72 A |
| 2012/0292081 A1 | 11/2012 | Kim et al. | |
| 2017/0140863 A1 * | 5/2017 | Aichi | H01F 27/306 |

* cited by examiner

WIRING MEMBER

CROSS-REFERENCE TO RELATED APPLICATIONS

This application is the U.S. national stage of PCT/JP2020/042244 filed on Nov. 12, 2020, which claims priority of Japanese Patent Application No. JP2019-214103 filed on Nov. 27, 2019, the contents of which are incorporated herein.

TECHNICAL FIELD

The present disclosure relates to a wiring member.

BACKGROUND

JP 2012-115023A discloses that rigidity for maintaining a bent shape of a wire harness is secured by the bending rigidity of the insulating coating of a plurality of electric wires or the bending rigidity of the conductors of a plurality of electric wires or some electric wires.

Here, if a linear transmission member such as a wire harness is bent at a sharp angle, a large distortion may occur in the coating. It is desired to further improve the reliability of a bent section of a linear transmission member even in such a case.

Therefore, the present disclosure aims to further improve the reliability of a bent section of a linear transmission member.

SUMMARY

A wiring member according to the present disclosure is a wiring member including: a linear transmission member that includes a bent section; and a resin molded portion molded with a path holding portion of the linear transmission member being inserted thereinto, the path holding portion including the bent section, wherein recesses are formed so as to expose portions of the path holding portion other than a portion where tensile stress is concentrated due to bending, to the outside.

Advantageous Effects

The present disclosure further improves the reliability of a bent section of a linear transmission member.

DETAILED DESCRIPTION OF PREFERRED EMBODIMENTS

Figure 1:
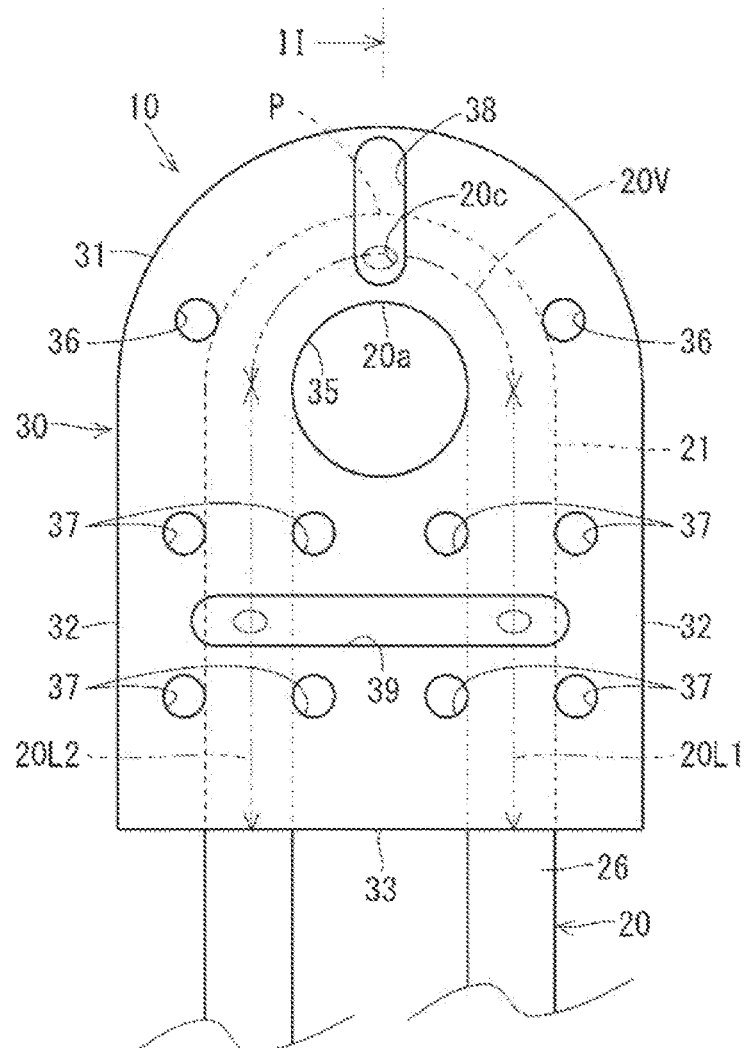
FIG. 1 is a plan view showing a wiring member according to an embodiment.

First, embodiments of the present disclosure will be listed and described.

A wiring member according to the present disclosure is as described below.

First Aspect

In a first aspect, a wiring member includes: a linear transmission member that includes a bent section; and a resin molded portion molded with a path holding portion of the linear transmission member being inserted thereinto, the path holding portion including the bent section, wherein recesses are formed so as to expose portions of the path holding portion other than a portion where tensile stress is concentrated due to bending, to the outside.

With the wiring member, the bent section of the linear transmission member is kept in a certain bent state in the resin molded portion. When the resin molded portion is to be molded, positioning members for positioning the path holding portion are disposed in the recesses, and therefore the position of the path holding portion is stable in the resin molded portion. As a result, the thickness of the resin molded portion covering the path holding portion is stable. In addition, recesses are formed so as to expose portions of the path holding portion other than a portion where tensile stress is concentrated due to bending, to the outside. Therefore, the portion of the path holding portion where tensile stress is concentrated due to bending is covered by the resin molded portion. Therefore, the reliability is further improved when the linear transmission member is bent.

Second Aspect

In a second aspect, the wiring member according to the first aspect, the portion of the path holding portion where tensile stress is concentrated due to bending may be a portion that has the smallest radius of curvature in the path holding portion. With this configuration, the portion that has the smallest radius of curvature is kept in the state of being covered by the resin molded portion.

Third Aspect

In a third aspect, the wiring member according to the first or second aspect, the portion of the path holding portion where tensile stress is concentrated due to bending may be a central portion of the bent section in a longitudinal direction thereof. With this configuration, the central portion of the bent section in the longitudinal direction thereof is kept in the state of being covered by the resin molded portion.

Fourth Aspect

In a fourth aspect, the wiring member according to any one of the first to the third aspect, the bent section may be a section where the linear transmission member is bent so as to be folded back. In this case, the reliability of a section bent so as to be folded back can be improved.

Fifth Aspect

In a fifth aspect, the wiring member according to any one of the first to the fourth aspect, the recesses may include an inner circumference-side recess that is formed closer to an inner circumference than the path holding portion is. In this case, the inner circumference-side portion of the linear transmission member is less likely to be subjected to tensile stress than the outer circumference-side portion is. Therefore, the reliability of the linear transmission member can be maintained even if a recess is formed in this portion.

Sixth Aspect

In a sixth aspect, the wiring member according to any one of the first aspect to the fifth aspect, the recesses may include an end-side recess located so as to expose an end portion of the path holding portion to the outside. In this case, the end of the path holding portion is less likely to be subjected to tensile stress than the central portion of the path holding portion is. Therefore, the reliability of the linear transmission member can be maintained even if a recess is formed in this portion.

Seventh Aspect

In a seventh aspect, the wiring member according to any one of the first to the sixth aspect, the portion of the path holding portion where tensile stress is concentrated due to bending may present in a portion close to the outer circumference of the bent section, and the recesses may include two sandwiching recesses located so as to sandwich the portion of the path holding portion where the tensile stress is concentrated due to bending from two sides of a plane in which the bent section is present. In this case, regarding the portion of the path holding portion where the tensile stress is concentrated due to bending, it is possible to position the path holding portion using positioning members or the like located in the two sandwiching recesses located so as to sandwich the portion from two sides of a plane in which the bent section is present.

Eighth Aspect

In an eighth aspect, the wiring member according to any one of the first to the seventh aspect, the resin molded portion may further include a coupling portion that connects portions that are continuous with two end portions of the bent section of the linear transmission member. As a result, with the coupling portion, the linear transmission member is likely to be kept in a bent state.

The following describes a specific example of a wiring member according to the present disclosure with reference to the drawings. Note that the present disclosure is not limited to the example, but is indicated by the scope of claims and is intended to include all modifications within the meaning and scope equivalent to the scope of claims.

EMBODIMENT

Figure 2:
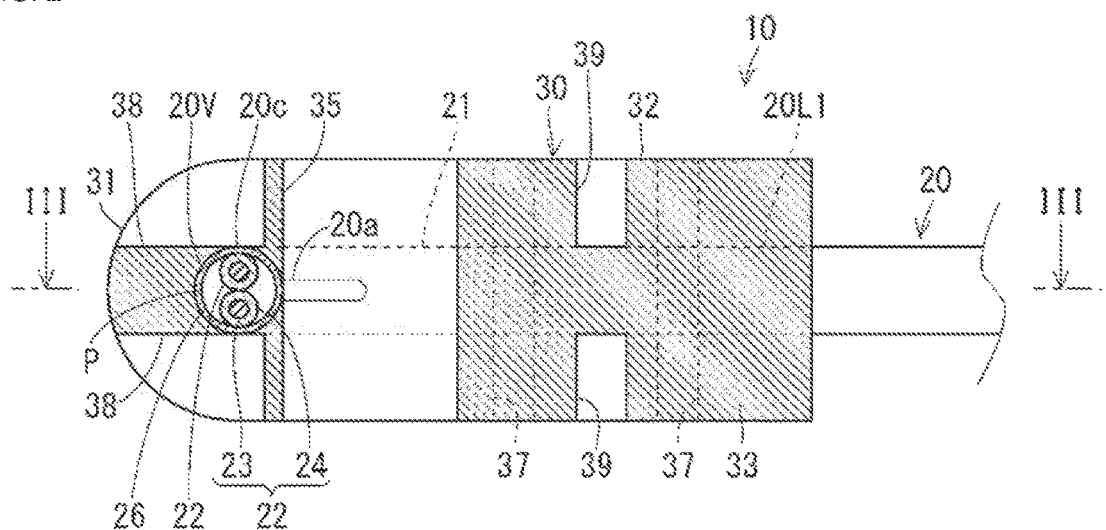
FIG. 2 is a cross-sectional view taken along the II-II line in FIG. 1.
Figure 3:
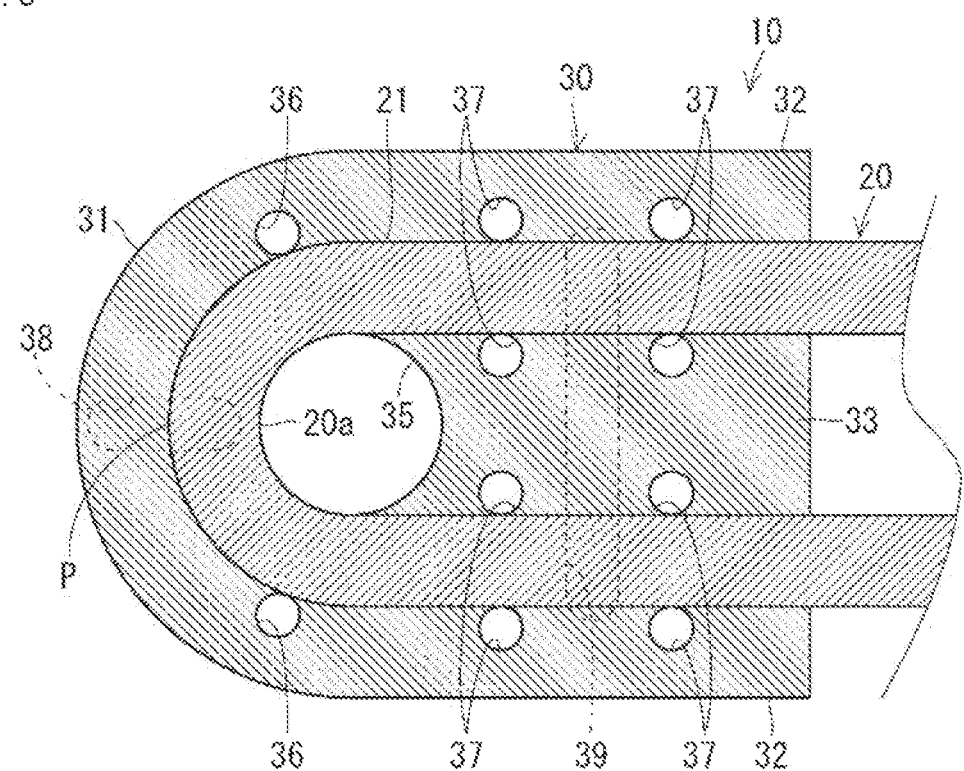
FIG. 3 is a cross-sectional view taken along the III-III line in FIG. 2.

Hereinafter, a wiring member according to an embodiment will be described. FIG. 1 is a plan view showing a wiring member 10. FIG. 2 is a cross-sectional view taken along the II-II line in FIG. 1. FIG. 3 is a cross-sectional view taken along the III-III line in FIG. 2. In FIG. 3, the internal structure of a linear transmission member 20 is simplified.

The wiring member 10 includes the linear transmission member 20 and a resin molded portion 30.

The linear transmission member 20 is a linear member that transmits electricity or light. Here, the linear transmission member 20 includes electric wires 22. Each electric wire 22 includes a core wire 23 and a coating 24. The core wire 23 is a linear member that is formed of a metal wire made of copper, a copper alloy, aluminum, an aluminum alloy, or the like. The core wire 23 may be a single wire or a stranded wire in which a plurality of strands are twisted together. The coating 24 is an insulating portion that encloses the core wire 23. The coating 24 is formed by extruding a resin so as to enclose the core wire 23, for example. The linear transmission member may include an optical fiber that transmits an optical signal.

The linear transmission member 20 may include only a single electric wire 22 or a plurality of electric wires 22. Here, the linear transmission member 20 includes a plurality of (two in this example) electric wires 22. Also, the linear transmission member 20 includes an outer cover 26 that encloses the plurality of electric wires 22. The outer cover 26 is made of resin or the like. The outer cover 26 is formed by extruding a resin so as to enclose the plurality of electric wires 22, for example.

The electric wires 22 may be signal lines or power lines. For example, when the wiring member 10 is to be mounted on a vehicle, the electric wires 22 may be power lines that supply power to an EPB (Electric Parking Brake) or an EMB (Electro-Mechanical Brake). For example, when the wiring member 10 is to be mounted on a vehicle, the electric wires 22 may be signal lines that transmit a signal from a sensor for detecting the speed of the wheels in an ABS (Anti-Lock Brake System). The wiring member may be used as a composite harness that includes a plurality of types of electric wires. As described above, when the wiring member includes an electric wire serving as a power supply line and an electric wire serving as a signal line, the wiring member is a composite harness. In particular, when the wiring member 10 includes a power line for electric braking and a signal line for detecting the vehicle speed, the wiring member is a composite harness for braking.

The linear transmission member 20 is envisioned as being disposed along a curved path in a vehicle or the like. Therefore, the linear transmission member 20 includes a bent section 20V Here, the bent section 20V is a section where the linear transmission member 20 is bent so as to be folded back. The wire transmission member 20 being folded back means, for example, that the wire transmission member 20 is bent so as to form an angle in the range of 175° to 185°. Here, the bent section 20V is a section where the linear transmission member 20 is bent so as to be folded back by 180°. The bent section 20V may be a section where the linear transmission member 20 is bent so as to form an angle smaller than 180°.

Straight sections 20L1 and 20L2 are respectively connected to the two ends of the bent section 20V of the linear transmission member 20. Another bent section may be continuous with each of the straight sections 20L1 and 20L2. Another bent section may be continuous with the bent section 20V.

A path holding portion 21 that includes the above-described bent section 20V of the linear transmission member 20 is the portion that is desired to be kept in a certain shape in the path along which the wiring member 10 is disposed. Here, the path holding portion 21 includes the above-described bent section 20V and the straight sections 20L1 and L2 at the two ends thereof. Here, the path holding portion 21 is a U-shaped portion in which the straight sections 20L1 and 20L2 are continuous with the two ends of the semicircular bent section 20V.

The resin molded portion 30 is a resin portion molded with the above-described path holding portion 21 being inserted thereinto. That is to say, the resin molded portion 30 is a resin portion formed using a mold. When the resin molded portion 30 is to be molded, the path holding portion 21 is disposed in the mold. As a result, the resin molded portion 21 is molded such that the path holding portion 30 is embedded therein. The resin molded portion 30 is made of polyurethane, for example. Polyurethane is highly resistant to external damage.

Recesses 35, 36, 37, 38, and 39 are formed in the resin molded portion 30. The recesses 35, 36, 37, 38, and 39 are formed so as to expose the portions of the path holding portion 21 other than the portion where tensile stress is concentrated due to bending, to the outside. The path holding portion 21 is partially exposed to the outside at the recesses 35, 36, 37, 38, and 39. Therefore, the path holding portion 21 can be supported by a positioning member or the like through the recesses 35, 36, 37, 38, and 39. As a result, the path holding portion 21 is embedded in the resin molded portion 30 at a certain position with high positional accuracy. The portions of the path holding portion 21 where the tensile stress is concentrated due to bending are covered by the resin molded portion 30 without being exposed to the outside through the recesses 35, 36, 37, 38, and 39. The resin molded portion 30 itself is molded in the state of covering the bent section 20V, and therefore the internal stress is small. Therefore, even if tensile stress is generated in the outermost layer (here, the outer cover 26) of the path holding portion 21 due to tensile stress caused by bending, the portion is kept in the state of being covered by the resin molded portion 30 on which only a small amount of internal stress acts. Note that the minimum bending radius (radius of curvature) may be specified for electric wires or cables. When electric wires or cables are bent with a radius no greater than or less than the minimum bend radius, a greater tensile stress acts on the outermost layer thereof. Therefore, when the bent portion 20V is bent with a radius no greater than or less than the minimum bending radius specified for the linear transmission member 20, it is preferable to employ a configuration in which the linear transmission member 20 is covered by the resin molded portion 30.

More specifically, the resin molded portion 30 is an integrated portion formed of resin, and includes a bent holding portion 31, straight holding portions 32, and a coupling portion 33.

The bent holding portion 31 is a portion that holds the bent section 20V. Here, the bent holding portion 31 covers the bent section 20V so as to keep the bent section 20V in a certain bent state.

The straight holding portions 32 are portions that hold the straight sections 20L1 and 20L2. Here, two straight holding portions 32 cover the straight sections 20L1 and 20L2 extending from the bent section 20V to keep each of the two straight sections 20L1 and 20L2 straight.

The coupling portion 33 is interposed between the two straight holding portions 32, and keeps the two straight holding portions 32 in a certain positional relationship. Here, the two straight holding portions 32 are held in parallel by the coupling portion 33.

Here, the bent holding portion 31 covers the entire bent section 20V in the longitudinal direction, but the bent holding portion may cover a portion of the bent section. It is not essential that one or both of the above-described two straight holding portions 32 are present. Also, the above-described coupling portion 33 may be omitted.

A portion where the tensile stress is concentrated in the above-described bent section 20V is covered by the bent holding portion 31. The tensile stress in the bent section 20V is more likely to occur in a portion that is closer to the outer circumference than in a portion closer to the inner circumference. A portion where the tensile stress is concentrated in the bent section 20V is, for example, the portion that has the smallest radius of curvature in the path holding portion 21. For example, when the radius of curvature fluctuates in the path holding portion 21, the tensile stress is likely to concentrate on the portion bent with the smallest radius of curvature. The portion where the tensile stress is concentrated in the bent portion 20 V is, for example, a central portion of the bent section 20V in the longitudinal direction.

In the present embodiment, a portion where the tensile stress is concentrated in the above-described bent section 20V is located in a portion P that is a central portion of the bent section 20V in the longitudinal direction and is a portion close to the outer circumference. In the present embodiment, the bent section 20V is bent with a constant radius of curvature, and therefore the above-described portion P is also an example of the portion that has the smallest radius of curvature in the path holding portion 21.

The above-described portion P is not exposed to the outside through the recesses 35, 36, 37, 38, or 39, and is covered by the resin molded portion 30. As described above, the recesses 35, 36, 37, 38, 39 are used to support the path holding portion 21, using a positioning member such as a positioning pin when the resin molded portion 30 is to be molded. As a result of the path holding portion 21 being disposed at a certain position in the resin molded portion 30, the covering thickness of the resin molded portion 30 covering the linear transmission member 20, particularly the covering thickness thereof at the portion P, is kept constant.

The recesses 35, 36, 37, 38, and 39 will be described.

The recess 35 is an example of an inner circumference-side recess 35 that is formed closer to the inner circumference than the path holding portion 21 is in the bent holding portion 31 of the resin molded portion 30. The inner circumference-side recess 35 is formed so as to extend in a direction orthogonal to the plane in which the bent section 20V is present. Here, the inner circumference-side recess 35 is formed as a hole penetrating through the front and back of the resin molded portion 30, but may be formed as a bottomed hole that is open only in one of the front and back of the resin molded portion. Here, the inner circumference-side recess 35 is formed as a columnar space. Therefore, the inner circumferential surface of the inner circumference-side recess 35 is formed so as to have the shape of the outer circumferential surface of a column. The entirety of an inner circumference-side portion 20a of the bent section 20V in the longitudinal direction of the bent section 20V is exposed to the inner circumference-side recess 35. When the resin molded portion 30 is to be molded, the positioning pin disposed in the inner circumference-side recess 35 can restrict the bent section 20V from being bent with a radius of curvature that is smaller than the outer diameter of the positioning pin.

The recesses 36 and 37 are examples of end-side recesses 36 and 37 that are located in the resin molded portion 30 so as to expose the end portions of the path holding portion 21 to the outside. Here, the end portions of the path holding portion 21 are, for example, end portions of the bent section 20V and the straight sections 20L1 and 20L2 connected to the end portions.

Two end-side recesses 36 are formed on the outer circumference-side of the end portions of the bent section 20V. Each end-side recess 36 is formed so as to extend in the same direction as the above-described recess 35. Here, each end-side recess 36 is formed as a hole penetrating through the front and back of the resin molded portion 30, but may be formed as a bottomed hole that is open only in one of the front and back of the resin molded portion. The above-described inner circumference-side recess 35 is formed on the inner circumference side of each end-side recess 36 with respect to the inner circumference of the bent portion 20V. Therefore, when the resin molded portion 30 is to be molded, the two end portions of the bent section 20V are sandwiched between the positioning pin located in the inner circumference-side recess 35 and the positioning pins provided in the end-side recesses 36. As a result, the bent section 20V is positioned in the resin molded portion 30 at a certain position with higher positional accuracy.

A plurality of sets of end-side recesses 37 are located so as to sandwich the straight sections 20L1 and 20L2 from two sides. Here, two sets of end-side recesses 37 are formed at two positions to sandwich the straight section 20L1, and two sets of end-side recesses 37 are formed at two positions to sandwich the straight section 20L2. Portions of the straight sections 20L1 and 20L2 are exposed from the end-side recesses 37. Therefore, when the resin molded portion 30 is to be molded, the straight sections 20L1 and 20L2 are sandwiched between the positioning pins disposed in the sets of end-side recesses 37, so as to be positioned at certain positions with high positional accuracy.

The recesses 38 are examples of two sandwiching recesses 38 that are located so as to sandwich the portion P of the path holding portion 21 where the tensile stress is concentrated due to bending from two sides of the plane in which the bent section 20V is present. Here, the two sandwiching recesses 38 are located so as to sandwich the portion P of the bent section 20V from both sides in the direction in which the inner circumference-side recess 35 extend (the penetrating direction). More specifically, the two sandwiching recesses 38 are formed in a groove shape formed so as to extend further toward the outer circumference side from positions spaced apart on the outer circumference side with respect to the inner circumference-side recess 35. Aside portion 20c that is adjacent to the portion P of the bent section 20V is exposed from the bottoms of the sandwiching recesses 38. Therefore, when the resin molded portion 30 is to be molded, the two positioning members located in the two sandwiching recesses 38 sandwich the bent section 20V near the above-described portion P. As a result, a portion in the vicinity of the above-described portion P of the bent section 20V is positioned in the resin molded portion 30 at a certain position with higher positional accuracy.

The recesses 39 include two recesses 39 located so as to sandwich the straight sections 20L1 and 20L2 of the path holding portion 21 from two sides of the plane in which the bent section 20V is present. Here, the two recesses 39 are located so as to sandwich intermediate portions of the straight sections 20L1 and 20L2 in the longitudinal direction from both sides in the direction in which the recesses 37 extend (penetration direction). More specifically, the two recesses 39 are formed in a groove shape that extend from one straight holding portion 32 to the other straight holding portion 32 via the coupling portion 33. The straight sections 20L1 and 20L2 are partially exposed from the bottoms of the recesses 39. Therefore, when the resin molded portion 30 is to be molded, the two positioning members located in the two recesses 39 sandwich the straight sections 20L1 and 20L2. As a result, the straight sections 20L1 and 20L2 are positioned in the resin molded portion 30 at certain positions with higher positional accuracy.

It is not essential that all the recesses 35, 36, 37, 38, and 39 are formed in the resin molded portion 30. It is only necessary that at least one recess in which a positioning member for positioning the linear transmission member can be disposed is formed in the resin molded portion. For example, only the above-described recess 35 may be formed in the resin molded portion.

With the wiring member 10 configured as described above, the bent section 20V is kept in a certain bent state by the resin molded portion 30. Therefore, the wiring member 10 can be easily disposed along a predetermined path in a vehicle or the like. In addition, when the resin molded portion 30 is to be molded, positioning members for positioning the path holding portion 21 are disposed in the recesses 35, 36, 37, 38, and 39, and therefore the position of the path holding portion 21 is stable in the resin molded portion 30. As a result, the thickness of the resin molded portion 30 covering the path holding portion 21 is stable. Also, the recesses 35, 36, 37, 38, and 39 are formed in the resin molded portion 30 so as to expose the portions of the path holding portion 21 other than the portion P where the tensile stress is concentrated due to bending, to the outside. Therefore, the portion P of the path holding portion 21, where the stress is concentrated due to bending, is kept in a state of being covered by the resin molded portion 30. Therefore, when the linear transmission member 20 is bent, the reliability of signal or power transmission through the linear transmission member 20 is further improved. In particular, reliability is improved when the linear transmission member 20 is bent with a radius that is less than or no greater than the minimum radius of curvature.

Also, the central portion P in the longitudinal direction of the bent section 20V, which is a portion of the path holding portion 21 where the tensile stress is concentrated due to bending, is covered by the resin molded portion 30, and therefore reliability is further improved.

Also, the portion of the path holding portion 21 with the smallest radius of curvature, which is the portion of the path holding portion 21 where the tensile stress is concentrated due to bending, is covered by the resin molded portion 30, and therefore reliability is further improved.

When the above-described bent section 20V is a section bent so that the linear transmission member 20 is folded back, a large amount of tensile stress is likely to be generated. In such a case, reliability is improved by inserting the bent section 20V into the resin molded portion 30.

Also, the inner circumference-side recess 35 is formed in the resin molded portion 30 on the inner circumference-side compared to the path holding portion 21. Compressive stress, rather than tensile stress, acts on the inner circumference-side portion of the linear transmission member 20. Therefore, even if the inner circumference-side portion of the linear transmission member 20 is exposed from the inner circumference-side recess 35, the linear transmission member 20 is sufficiently protected. Therefore, the reliability of the linear transmission member 20 is maintained.

In addition, a portion of the path holding portion 21 where the tensile stress is concentrated due to bending is present in a portion close to the outer circumference of the bent section 20V. The two sandwiching recesses 38 are located so as to sandwich the portion P from two sides of the plane where the bent section 20V is present, avoiding the portion P where the tensile stress is concentrated. Therefore, the bent section 20V can be positioned using the positioning members disposed in the two sandwiching recesses 38 in the vicinity of the portion P, without exposing the portion where the tensile stress is likely to be concentrated.

Also, the resin molded portion 30 can be molded in a state where end portions of the path holding portion 21 are positioned using the positioning members disposed in the end-side recesses 36 and 37. The end portions of the path holding portion 21 are less likely to be subjected to tensile stress than the central portion of the path holding portion 21. Therefore, even if the linear transmission member 20 is exposed from these portions, the reliability of the linear transmission member 20 can be maintained.

Also, the resin molded portion 30 includes the coupling portion 33 that connects portions that are continuous with two end portions of the bent section 20V of the linear transmission member 20, specifically the two straight holding portions 32 here. Therefore, the linear transmission member 20 is likely to be kept in a bent state.

Modification

Figure 4:
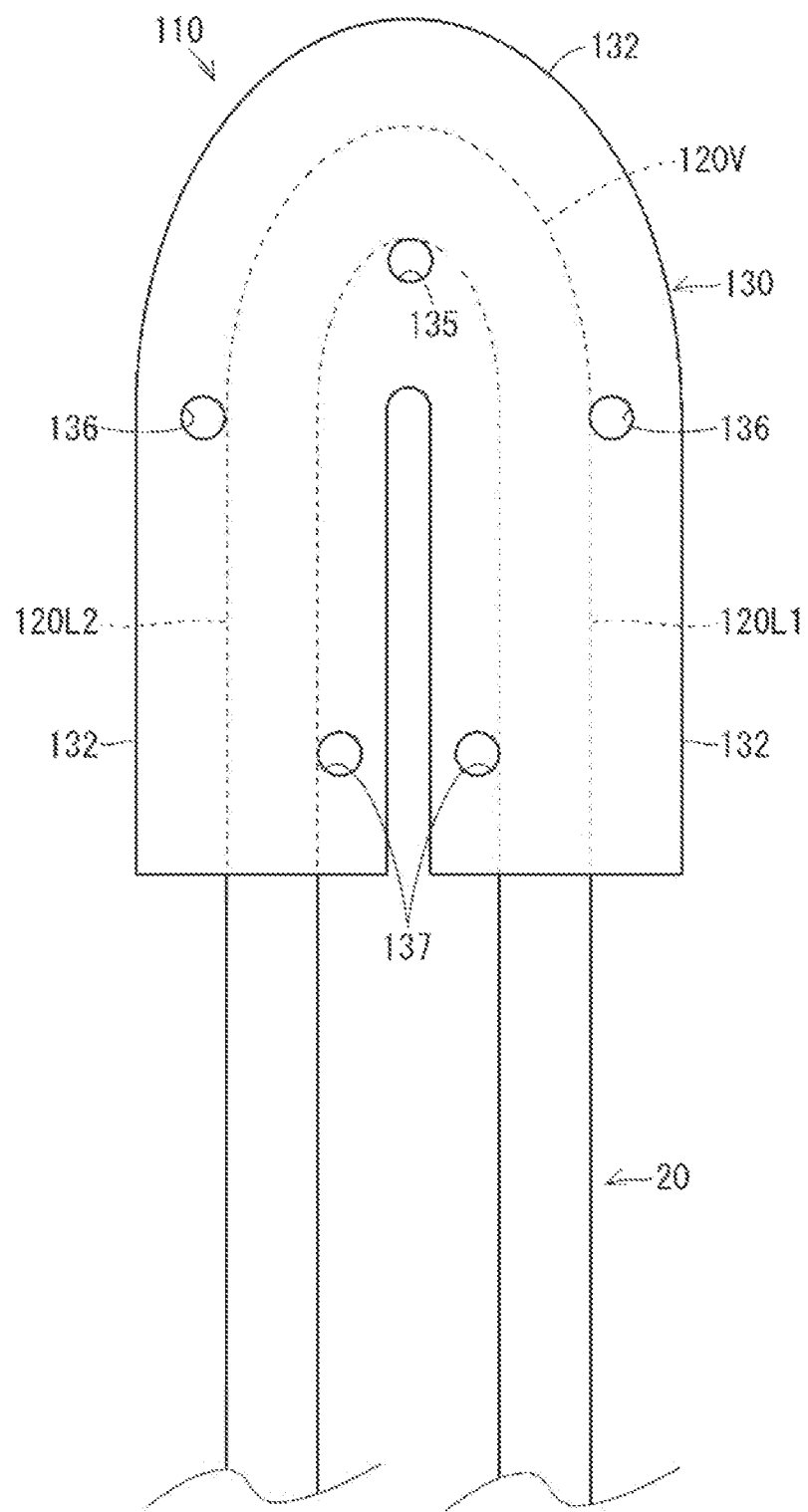
FIG. 4 is a plan view showing a wiring member according to a modification.

FIG. 4 is a plan view showing a wiring member 110 according to a modification. Hereinafter, the main differences of the wiring member 110 from the above-described wiring member 10 will be described.

In the wiring member 110, a bent section 120V corresponding to the bent section 20V is bent so that the radius of curvature changes in the longitudinal direction thereof. More specifically, the bent section 120V is formed so that the radius of curvature thereof is smallest in the central portion in the longitudinal direction thereof, and the radius of curvature increases toward the outside. The bent shape of the bent section 120V is kept constant by a bent holding portion 131 corresponding to the bent holding portion 31. In such a case, the greatest amount of tensile stress is likely to act on the portion P that is a portion close to the outer circumference of the bent section 120V and is a central portion in the longitudinal direction. It is preferable that recesses 135, 136, and 137 are formed in portions other than such a portion P.

In addition, in this wiring member 110, the recess 135 is formed in a resin molded portion 130 corresponding to the resin molded portion 30, at a position on the side of the inner circumference of the above-described bent section 120V. The recess 135 is an example of an inner circumference-side recess 135. A portion of the bent section 20V is exposed from the inner circumferential surface of the recess 135. However, the bent section 20V is not exposed in a state of being elongated in the longitudinal direction thereof. Therefore, the positioning member disposed in the recess 135 does not regulate the bent shape of the bent section 120V.

The recesses 136 are provided in the resin molded portion 130 at positions outward of the portions between the bent section 120V and straight sections 120L1 and 120L2 corresponding to the straight sections 20L1 and 20L2. The recesses 137 are formed at inner positions in the ends of the straight sections 120L1 and 120L2. The recesses 136 and 137 are examples of end-side recesses. As described above, the positions, shapes, and so on of the recesses formed in the resin molded portion are not particularly limited.

In addition, in the wiring member 110, the coupling portion 33 is omitted. Therefore, a gap is provided between two straight holding portions 132 corresponding to the two straight holding portions 32.

Note that the configurations described in the above embodiment and modification can be combined as appropriate provided they do not conflict with each other.

The invention claimed is:

1. A wiring member comprising:
   a linear transmission member that includes a bent section; and
   a resin molded portion molded with a path holding portion of the linear transmission member being inserted thereinto, the path holding portion including the bent section,
   wherein recesses are formed so as to expose portions of the path holding portion other than a portion where tensile stress is concentrated due to bending, to the outside, and wherein the recesses include an inner circumference-side recess that is formed closer to an inner circumference than the path holding portion is.

2. The wiring member according to claim 1, wherein the portion of the path holding portion where tensile stress is concentrated due to bending is a portion that has the smallest radius of curvature in the path holding portion.

3. The wiring member according to claim 1, wherein the portion of the path holding portion where tensile stress is concentrated due to bending is a central portion of the bent section in a longitudinal direction thereof.

4. The wiring member according to claim 1, wherein the bent section is a section where the linear transmission member is bent so as to be folded back.

5. The wiring member according to claim 1, wherein the recesses include an end-side recess located so as to expose an end portion of the path holding portion to the outside.

6. The wiring member according to claim 1, wherein the portion of the path holding portion where tensile stress is concentrated due to bending is present in a portion close to the outer circumference of the bent section, and
   the recesses include two sandwiching recesses located so as to sandwich the portion of the path holding portion where the tensile stress is concentrated due to bending from two sides of a plane in which the bent section is present.

7. The wiring member according to claim 1, wherein the resin molded portion further includes a coupling portion that connects portions that are continuous with two end portions of the bent section of the linear transmission member.

* * * * *